Figure 1:
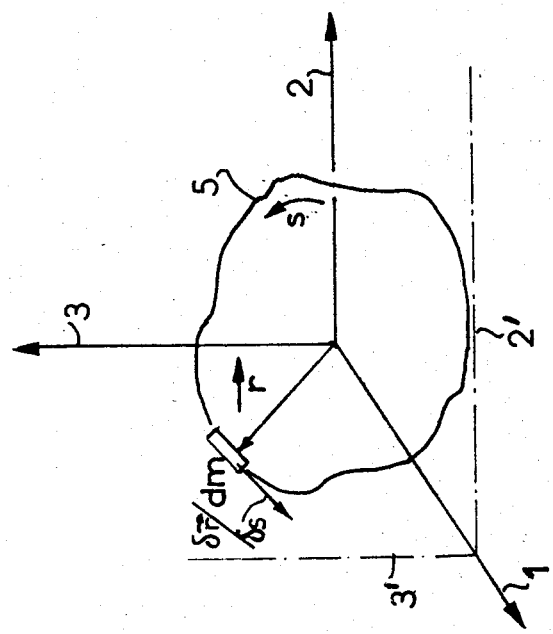

United States Patent [19]

Engelking

[11] Patent Number: 4,504,033

[45] Date of Patent: Mar. 12, 1985

[54] STABILIZING DEVICE FOR GYROSCOPE EFFECT APPARATUS SUCH AS A SPACE CRAFT OR VEHICLE, ESPECIALLY WITH A VIEW TO DAMPING THE NUTATION MOTION

[75] Inventor: Uwe Engelking, Katwijk Pays Bas, Netherlands

[73] Assignee: Agence Spatiale Europeenne, Paris, France

[21] Appl. No.: 629,745

[22] Filed: Jul. 10, 1984

Related U.S. Application Data

[63] Continuation-in-part of Ser. No. 309,776, Oct. 8, 1981, abandoned.

[30] Foreign Application Priority Data

Oct. 10, 1980 [FR] France ............................ 80 21707

[51] Int. Cl.³ .......................... B64G 1/38; B64G 1/28
[52] U.S. Cl. .................................... 244/170; 244/165
[58] Field of Search ............. 244/164, 165, 170, 171, 244/78, 93; 74/5 R, 5.5, 572, 573

[56] References Cited

U.S. PATENT DOCUMENTS

| 2,856,142 | 10/1958 | Haviland | 244/93 |
| 3,097,818 | 7/1963 | Heller | 244/78 |
| 3,423,613 | 1/1969 | Davis | 244/170 |
| 3,728,900 | 4/1973 | Engelking | 244/170 |
| 3,862,732 | 1/1975 | Wyatt et al. | 244/165 |
| 4,193,570 | 3/1980 | Hoffman et al. | 244/170 |

Primary Examiner—Trygve M. Blix
Assistant Examiner—Rodney Corl
Attorney, Agent, or Firm—Fidelman, Wolffe & Waldron

[57] ABSTRACT

The nutation damper comprises a closed flow path for a dense liquid, which may be a propellent and a pump for setting the liquid in periodic motion, thereby to dissipate or generate rotational energy controlled by a detector sensitive to a parameter relating to the nutation angle, according to the law of conservation of angular momentum. The principal application of the device is to the nutation damping of spinning spacecraft, in which the ratio between the moment of inertia about the spin axis and the lateral moment inertia is greater or less than 1.

25 Claims, 4 Drawing Figures

STABILIZING DEVICE FOR GYROSCOPE EFFECT APPARATUS SUCH AS A SPACE CRAFT OR VEHICLE, ESPECIALLY WITH A VIEW TO DAMPING THE NUTATION MOTION

This application is a continuation-in-part of application Ser. No. 309,776, filed 10/8/81, now abandoned.

The present invention relates to stabilizing devices for gyroscope effect apparatus, such as space craft or vehicles, particularly artificial satellites or multi-stage rockets, and more particularly to craft which have their own rotation, especially with a view to damping their nutation motion.

It is known that nutation is the motion of the axis of rotation of the apparatus (which corresponds to the direction of its angular velocity vector) in a cone about the angular momentum vector. It is also known that, in very many cases, the stability of space craft such as satellites is ensured by rotation about their axis of symmetry, which in this case forms the axis of rotation or spin axis, this rotation creating a gyroscopic effect which stabilizes this axis relative to the stars, the initial value of the stabilizing spin being generally maintained by periodic acceleration impulses given by small rockets. Speaking more generally, in view of a given mission, it is another, different, axis of the craft that must keep a defined orientation.

However it happens that, even if in the initial conditions the angular momentum vector coincides with the axis whose orientation is to be maintained, this vector only stays unchanged if no external torque is applied to the apparatus, which is no longer the case in various circumstances, such as adjustment of orientation, separation of the apparatus from its carrier rocket or again a sudden displacement of a large mass of propergol liquid. The stabilizer devices considered here are designed to nullify the nutation motion which appears in such cases, or even to prevent increase of the nutation angle immediately when this nutation tends to appear, and taking account of the fact that the nutation angle varies with the rotational energy of the craft.

It is known, for example by U.S. Pat. No. 3,728,900 for such stabilizer devices to comprise means for dissipating the rotational energy, for example consisting of a ball which can move in a curved tube containing a gas.

These devices are passive nutation dampers, however, since they use the dissipation of rotational energy due to the friction of the gas during movement of the ball, and such devices are only usable in cases where the ratio between the moment of inertia about the spin axis to the lateral moment of inertia is greater than one, since it is only in this case that the nutation angle can decrease by dissipation of rotational energy. On the contrary, when this ratio is less than one, the nutation angle can only decrease by increase of the rotational energy.

Other stabilizer devices are known which enable the rotational energy to be increased, some using orientation control rockets which enable a reduction in the lateral component of the angular momentum vector (it being understood that here, as below, reference is made to a system of orthogonal reference axes relating to the craft considered), while others use reaction wheels.

Now the thrust rocket devices no longer allow the system of the craft thus equipped to be considered as a closed system (the angular momentum vector can change in magnitude and direction), while the reaction wheel devices only offer a poor efficiency for nutation damping because of their relatively low moments of inertia (of the order of 0.1 Kg m$^2$) which require much too much "hidden" power (stored in the wheel because of its cyclic motion) relative to the useful power (power effectively developed during a movement cycle).

Thus the object of the invention is to provide a stabilizer device for a gyroscope effect apparatus which can be used so that the ratio of the moments of inertia (about the spin axis and lateral) can indifferently be greater than or less than one, while forming with the apparatus a closed system and giving improved efficiency (to be understood at equal size, or at least at equal transverse size).

To this end, the invention provides a stabilizer device for gyroscope effect apparatus having three orthogonal reference axes of which one is a spin or rotational axis, characterised in that it comprises, on one hand a capacity which can at least partially be filled with a dense fluid, and on the other hand means for applying pressure, or for creating pressure potential, which are in relation with said fluid in such a way as to be able to subject the fluid to forced oscillations, or make it circulate, within said capacity in one direction or the other along the circulation trajectory, said pressure applying means being connected to and controlled by a detector element for detecting a physical parameter related to the nutation angle, so as to be able to act on the amplitude and phase of said oscillations, said control acting according to a law which respects the equation of conservation of angular momentum. Preferably the dense fluid used is a liquid, and suitably a liquid whose density is of the order of 1000 Kg/m$^3$.

Due to this arrangement, and because the freely rotating apparatus with the fluid circulation device form, from the mechanics point of view, a closed system presenting a constant angular momentum vector, the rotational energy of this system forms the only parameter which can influence the nutation angle, so that observation of the equation of conservation of angular momentum enables the nutation angle to be maintained or brought to as small a value as possible. This result is advantageously obtained whether the ratio of the moments of inertia (about the spin axis and lateral) is greater or less than one, which is all the more important if both cases can occur in the range of uses of a space craft, for example during separation of a train of satellites, for which the ratio is less than one before the separation and greater (for each of the two satellites) after separation: indeed, the same fluid circulation device and the same control law are used with no change. Moreover, it is possible with the device provided, to counteract, using a relatively low power demand on the pressure application means, unstabilising movements causing a nutation effect, which may even have very short time constants (of the order of 1 minute), for example during sudden displacements of propergol and with moment of inertia ratio below one.

Very advantageously, the circulation capacity presents a general plane of symmetry which is parallel to, or passes through, the axis of rotation of the apparatus, the detector of a physical parameter related to the nutation angle can be an angular velocity detector, and the control law of the pressure applying means can be such that the fluid flow caused by these means is substantially directly proportional to one of the components of angular velocity, so that this control law is particularly simple and can be achieved by equally uncomplicated means. Preferably, the control law is such that the flow is proportional to the angular velocity component along the axis orthogonal to the spin axis which defines with the spin axis a plane parallel to or coinciding with the mean plane of symmetry of the circulation capacity, and the detector element can be an angular accelerometer.

The fact of using the rotational velocity as parameter is particularly advantageous from the point of view of efficiency, given that in this case the greatest part of the power supplied by the pressure applying means is used to modify the rotational energy of the apparatus, while only a small fraction of this power ("hidden" power) is stored in the circulating liquid (the hidden power being as little as about 50 times less than that obtaining in the case of a reaction wheel).

For small nutation angles, the characteristic of a solid flywheel is highly nonlinear, due to friction. The control of wheel rotation becomes rather problematic at the low rotation speeds related to small nutation angles. The flywheel wobbles in a not very well defined limit cycle preventing further nutation damping below a certain threshold. In contradistinction, liquids are superior since the threshold for liquid loop nutations dampers is about one order of magnitude lower than that of the flywheel.

It is highly desirable for the delay, or response time, existing between the emission of the signal given by the detector and the start of circulation of the liquid be as short as possible, and this delay should in any case not exceed about 10% of the nutation period; phase compensation circuits enable this delay to be reduced considerably.

In particularly advantageous fashion, in the case where the gyroscope effect apparatus is a space craft or vehicle propelled with the use of a propergol liquid, the said circulating fluid can be formed by this propergol or by one of its constituents, and the circulation capacity can be associated with at least one reservoir for the propergol or constituent. This arrangement makes available, for the circulation desired, a very large quantity of liquid and therefore increases by as much the damping effect. The circulation capacity can be fixed on the reservoir, inside it or outside, or can even, when two reservoirs are provided for the same liquid, connect the two reservoirs.

In a particular embodiment of the invention, this same circulation capacity can be formed by an annular capacity which is closed round on itself, so as to form a loop, and in which are interposed the pressure applying means. Preferably, the annular circulation capacity can comprise an almost closed tube disposed within said reservoir, whose two ends are connected by piping which passes through, at two adjacent places, the wall of the reservoir so as to close the loop outside the reservoir where the pressure applying means are interposed. Moreover, in the case where the stock of liquid is a shape of revolution, the almost closed tube is also preferably on a central circular line and disposed in a plane perpendicular to an axis of revolution of the reservoir and coming close to the wall of the reservoir. This circular shape enables the area subscribed by the annular capacity to be a maximum and which therefore correspondingly reduces the "hidden" power, given that the "hidden" power is inversely proportional not only to the mass of circulating liquid but also to this area subscribed by the circulating capacity.

Means can also be provided for separating the annular capacity into several sections, which enables only certain sections to be filled (for example in the case where the stock is formed by a propergol reservoir which happens to be almost empty so that it is useful to recover part of the liquid contained in the capacity) while retaining a certain availability of damping.

In another particular embodiment of the invention, the device can comprise a stock of liquid and the circulation capacity can comprise piping outside the stock, with its two ends connected to the stock, so as to communicate with the space inside the stock, at two places spaced apart from each other, this piping being completed by the space inside the stock, to form the circulation capacity. In this way, from a functional point of view, a large part of the liquid contained in the stock is subjected to the circulation produced by the pressure applying means, which considerably favours the damping effect. Moreover, this arrangement also constitutes a simplification of the device from a manufacturing point of view. The piping outside the stock can, in particularly advantageous fashion, open into the stock by means of a pair of diffuser members, preferable formed by funnel-shaped parts, which then form the only structural elements of the device inside the stock.

In this same second embodiment, in order to avoid the liquid flow which has just entered the stock by one of the communications returning to it instead of going towards the other communication in such a way as to follow the complete circulation trajectory, several associated pairs of communications can be provided (possibly with the same number of diffusers) which cooperate in pairs using only distinct parts or zones of the space inside the stock thus reducing the risk mentioned above. These pairs of communication are advantageously disposed symmetrically about a centre of symmetry of the stock, and in the case where diffusers are provided, they can be connected by portions of tube assembled in parallel. With the same objective, and in a particularly advantageous way, since it is simpler, if not more efficient, a separate member can be provided which divides the reservoir in two parts in which are respectively positioned the two communications with the external piping and which has a communication passage between the two parts of the stock. Preferably, this separator member consists of a membrane which extends along a complete section across the stock and presents, as communication passage, an orifice disposed preferably at the opposite side to the two communications with the piping. The pressure applying means, in the simplest form, consist either of a reversible pump (gear or propeller pump), or of a non reversible pump (centrifugal pump) associated with a distributor for controlling the circulation and flow directions.

Figure 2:
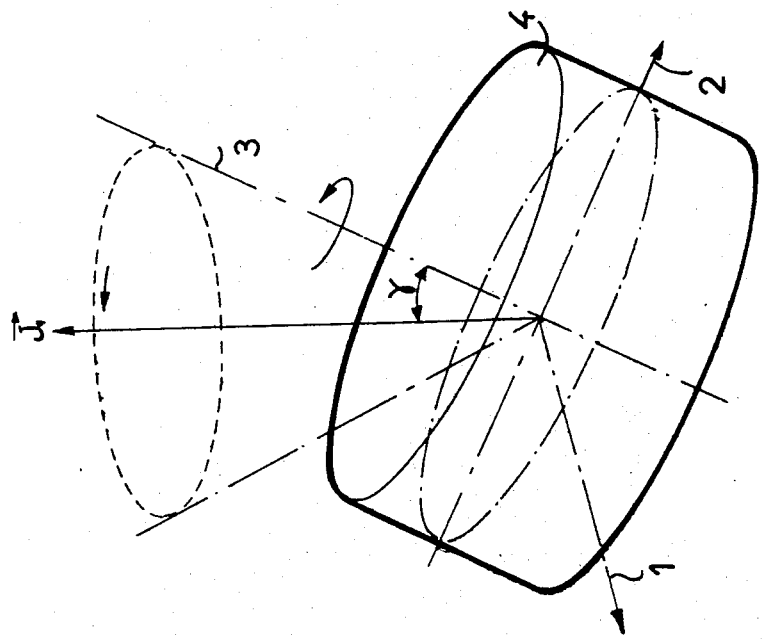
Figure 3:
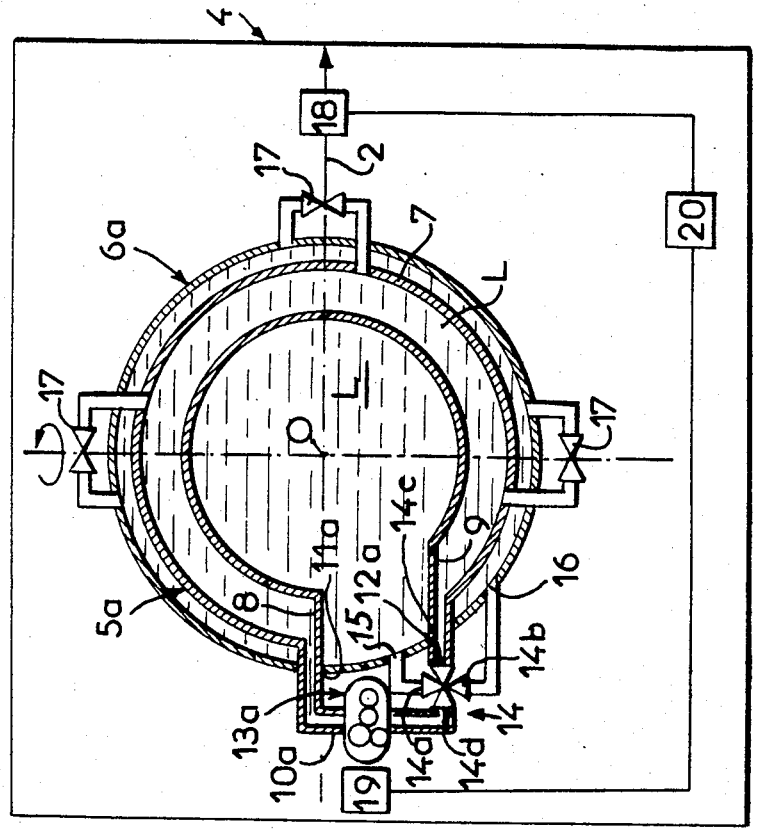

Other features and advantages of the invention will appear from the following description given by way of non-limitative example with reference to the accompanying drawings, in which:

FIG. 1 shows the rotational motion of a gyroscope apparatus such as a space craft, FIG. 2 shows diagrammatically the particular orientation relative to such a craft, of a stabilizer device in accordance with the invention having a particularly advantageous arrangement, FIG. 3 shows schematically, on a section taken through its mean plane of symmetry, such a device according to a first particular embodiment, FIG. 4 shows, again schematically, but in perspective, a device corresponding to a second particular embodiment of the invention.

FIG. 1 shows a gyroscopic apparatus such as a space vehicle 4, indicated as of generally cylindrical shape, although it could equally well be spherical, this craft presenting an axis 3 for rotation about itself, or spin axis, and also two other axes 1 and 2 which are orthogonal with each other and with the axis 3, and form with the latter a reference trihedral which is fixed relative to the craft. When the craft is subjected to a nutation motion, the angular momentum vector $\vec{J}$ of the craft does not coincide with the spin axis 3, the spin axis describing a conical motion about the vector $\vec{J}$, at an angle which forms the nutation angle $\gamma$.

As shown diagrammatically in FIG. 2, in which the reference trihedral 1-2-3 relating to the craft has been turned relative to the position shown in FIG. 1 so that the spin axis 3 is vertical, in order to make a device according to the invention, a closed annular capacity 5 is advantageously provided, shown here diagrammatically. The capacity 5 is, of course, solid with the craft 4, but for the sake of clarity, the craft is not shown. The capacity 5 referred to is arranged to present a mean plane of symmetry which is formed by a plane being, in the advantageous embodiments referred to above, a plane 2'-3' parallel to the plane 2-3. The reason for this particular arrangement will appear from the presentation of the theory given later in this description.

The device according to the first particular embodiment shown in FIG. 3 is directly associated with the reservoir 6a of propergol liquid (or a propergol constituent) which is fitted to the space craft, this reservoir presenting in this particular case a spherical shape whose centre 0 corresponds with the centre of the reference trihedral 1-2-3 (it being understood that this centre 0 could be spaced along the axis 1 so that the overall plane of symmetry remains parallel to the plane 2-3.

The stabilizer device or nutation damper provided in this embodiment comprises an annular circulation capacity 5a which comprises firstly a tube 7 which is practically closed round on itself and has a shape like that of a torus, this tube being disposed within the reservoir so that the director circle of the torus is disposed in the plane 2-3 and centred on the point 0, and also comes close to the wall of the reservoir 6a. This toric shaped tube, not entirely closed, has two ends 8 and 9 situated adjacent each other. By way of example, this tube can have a circular cross-section of 10 cm diameter, while the radius of the director circle is of the order of 50 cm, so that the area subscribed by the tube is of the order of 0.8 m² and the cross-section of the passage within the tube about 0.8 dm².

To complete the capacity 5a, it also comprises piping 10 which connects the ends 8 and 9 of the tube 7 and passes through the wall of the reservoir 6a in two adjacent places 11a and 12a so as to close on itself outside the reservoir. In this piping are interposed a gear pump 13a and a four-way valve 14 with two of the valve passages connected by pipes respectively to orifices 15 and 16 which open into the space inside the reservoir 6a, while the other two valve passages 14c and 14d communicate with the piping 10. Three liquid outlet valves 17 are also provided, inserted in secondary piping connecting the tube 7 with the space inside the reservoir 6a at three places disposed at right angles with each other and with the place where the piping 10 enters the reservoir.

The device is completed by a detector 18 which detects the component $\omega_2$ of the angular velocity of the craft along the axis 2, this detector consisting for example of an angular accelerometer and being connected to a rotary drive 19, for driving the pump 13, through an interface comprising an inverter and demultiplier circuit 20 which transforms the signal from the detector 18 according to the law:

$$M = \frac{K}{2F} \omega_2 \tag{E}$$

in which $\dot{M}$ is the quantity of liquid per unit of time which flows through the transverse cross-section of the capacity 5a at any point, $\omega_2$ is the component of angular velocity of the craft along the axis 2, K is a constant and F is the area subscribed by the tube 7.

The operation of the apparatus described above is as follows:

The capacity 5a is first of all filled on the ground, the reservoir 6a being filled with liquid propergol or a constituent of the propergol. To this end, the valve 14 is opened so as to provide communication respectively between the passages 14a and 14d and between the passages 14b and 14c, the liquid being thus drawn into the capacity 5a from the reservoir 6a through the passage 14a, 14d, while the air or gas situated in the capacity is evacuated through the passages 14b and 14c. Once the tube is filled, the valve is moved so that only the passages 14c and 14d communicate, the other two passages being closed. The device is accordingly ready for use once the craft is launched into space.

When the craft is on trajectory and put into rotation about its spin axis 3, the detector 18 picks up at every moment the value of the component $\omega_2$ and causes the pump 13a to be driven in accordance with the equation (E) above. The pump 13a thus sets into motion the liquid L contained in the tube 7, the circulatory motion being oscillatory since the drive 19 for the pump 13a is reversible, and the liquid movement thus follows the corresponding oscillatory variation of the component $\omega_2$ (this oscillatory variation being due to the fact that the nutation motion which the craft 4 and its spin axis 3 undergo about the vector J is a periodic motion).

The following theory of the nutation damping referred to is given by way of example:

As the reference axes 1,2,3 coincide with the main axes of the craft 4, the moment of inertia tensor can be written:

$$I = \begin{pmatrix} I_1 & 0 & 0 \\ 0 & I_2 & 0 \\ 0 & 0 & I_3 \end{pmatrix} \tag{I}$$

This moment of inertia takes account of the stabilizer device with its annular capacity described above.

The angular velocity of the craft being $$\vec{\omega} = (\omega_1, \omega_2, \omega_3)$$

the combined angular momentum of the circulation capacity and the rest of the craft has the value, when the liquid is not set in motion by the pump:

$$\vec{J} = \begin{pmatrix} I_1 \omega_1 \\ I_2 \omega_2 \\ I_3 \omega_3 \end{pmatrix} \quad (2)$$

When an elementary mass dm of liquid, as shown diagrammatically in FIG. 2, is displaced with the rest of the liquid L by the pump 13a, it has a corresponding elementary angular momentum:

$$d\vec{J_L} = \vec{r} \times \frac{\vec{\delta r}}{\delta t} \cdot dm$$

where $\vec{r}$ is the vector distance of this elementary mass relative to the origin of the trihedral and $\delta/\delta t$ is the partial derivative with relative time not taking into account the movement of the craft.

Given that the relative speed of the elementary mass dm is:

$$\frac{\vec{\delta r}}{\delta t} = \frac{\vec{\delta r}}{\delta s} \cdot \dot{s}$$

s being the curvilinear abscissa of the elementary mass dm in the circulation loop formed by the annular capacity 5a, $\dot{s}$ being the scalar value of the relative velocity of the elementary mass dm, and $\vec{\delta r}/\delta s$ being a unit vector tangent to the said loop (see FIG. 2), it follows that:

$$d\vec{J_L} = \vec{r} \times \frac{\vec{\delta r}}{\delta s} \cdot \dot{s} \cdot dm = \vec{r} \times \frac{\vec{\delta r}}{\delta s} \cdot \frac{dm}{dt} \cdot ds \quad (5)$$

Because of the law of continuity which requires that the liquid flow through any transverse cross-section of the circulation loop is identical, $\dot{m}$ is independent of $\vec{r}$, so that integration of equation (5) gives:

$$\vec{J_L} = \frac{dm}{dt} \oint_{(s)} \vec{r} \times \frac{\vec{\delta r}}{\delta s} \cdot ds = \dot{m} \cdot 2 \cdot \vec{F}$$

where F is the area subscribed by the circulation loop (tube 7) along the axis 1. This is precisely why the plane of the loop 5 (FIG. 2) was chosen to be disposed in a plane parallel to the axes 2-3, or more precisely why this reference axis 2 was chosen so that the plane 2'-3' of the loop 5 would be parallel to the plane 2-3, and $\vec{F}$ would be parallel to the axis 1, so that the same applies to the component $J_L$ of the angular momentum which corresponds to the movement of the liquid in the loop 5.

It follows that the total combined angular momentum of the craft and the circulation capacity, with the liquid in circulation, has the value:

$$\vec{J_t} = \vec{J} + \vec{J_L} = \begin{pmatrix} I_1\omega_1 + 2F\dot{m} \\ I_2\omega_2 \\ I_3\omega_3 \end{pmatrix} \quad (7)$$

Given that the combination of the craft and loop is a closed system, conservation of angular momentum requires:

$$d\frac{\vec{J_t}}{dt} = \frac{\vec{\delta J}}{\delta t} + \frac{\vec{\delta J_L}}{dt} + \vec{\omega} \times (\vec{J} + \vec{J_L}) = 0 \quad (8)$$

The third component of this equation along the axis 3 can be written:

$$I_3\dot{\omega}_3 - (I_1 - I_2)(\omega_1\omega_2) - 2F\dot{m}\omega_2 = 0$$

Moreover, to the extent that the complete craft is practically symmetrical about the direction of the axes 1 and 2, the term $(I_1 - I_2)$ is small or zero, and this equation can thus become:

$$I_3\dot{\omega}_3 = 2F\dot{m}\omega_2$$

Taking account of the control law imposed on the drive of the pump 13a, which is given by equation (E), it follows that:

$$I_3\dot{\omega}_3 = K\omega_2^2$$

The conclusion is that the derivative of spin velocity $\dot{\omega}_3$ has a constantly positive value which means that the spin velocity $\omega_3$ always tends to increase when the liquid is set in circulatory motion by the device and that consequently, the overall angular momentum being constant, the nutation angle γ must decrease correspondingly.

It is thus seen that the desired result is indeed obtained, that is the reduction or damping of the nutation angle, by imposing on the loop of liquid contained in the circulation capacity 5a, a motion such that the fluid flow respects equation (E) given above, provided that the circulation capacity 5a is disposed so that its mean plane is parallel to the plane of the orthogonal reference axes 2 and 3, the detector 18 being responsive to the component of angular velocity $\omega_2$ of the craft along the axis 2, and the axis 3 being the spin axis.

If equation (E) is combined with the first two terms of equation (8) with a view to determining the stability of the system, a characteristic equation would be obtained which, taking account of the Routh stability criteria, leads to the conclusion that the conditions for stability are observed, that is to say the amplitudes of $\omega_1$ and $\omega_2$ are indeed damped and the motion is stable, when the phase difference between $\omega_2$ and $\dot{m}$ is reduced to a very small or zero value, using phase compensation circuits.

Moreover, if one calculates the pumping power required to circulate the liquid at the given mass flow rate $\dot{m}$, taking account of the pressure difference required to overcome the friction in the liquid, it can be shown that:

the "hidden" power, that is to say stored in the liquid, since the cross-section of the circulation capacity 5a is constant, has a value which is less the greater the mass m of the liquid and the greater the area F of the circulation loop. Thus with a device of the dimensions indicated above by way of example, and using hydrazine as the circulation liquid, the "hidden" power is about 50 times less than that which would obtain if a reaction wheel were used instead.

in addition, assuming a small nutation angle, and taking account of the hydraulic losses due to the liquid friction calculated at the maximum design circulation speed of the liquid, the total power to be supplied to the pump, that is to say consumed by the pump, is five times less than in the case where a reaction wheel of similar overall size and even though the efficiency of the pump is only of the order of 0.5 whereas the mechanical efficiency of a reaction wheel is of the order of 0.9.

If, in orbit, the tube 7 has to be partially or entirely emptied, either because a reduced performance is to be obtained, or because the craft is stabilized in all three axes, the outlet valves 17 are opened and the valve 14 operated to put the passages 14b-14c and 14d-14a respectively in communication.

Figure 4:
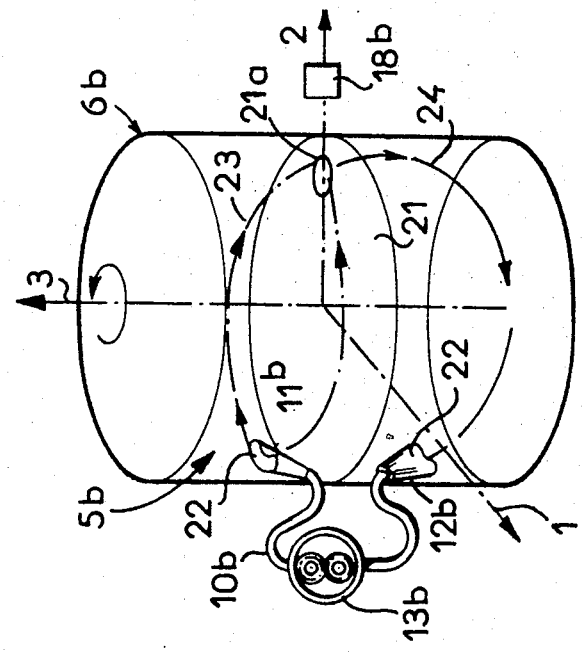

The second embodiment, shown in FIG. 4, is a design in which the liquid L does not move round in a tube, as in the embodiment of FIG. 3, given that the only necessary condition to obtain the desired stabilization is the existence of circulation of the liquid round a closed loop 5b. To this end, the device of FIG. 4 is associated with a propergol reservoir 6b, which as a variant is cylindrical, and comprises piping 10b which is disposed outside the reservoir 6b, like the piping 10a of the embodiment of FIG. 3, in such a way that the two ends of the piping are connected to the reservoir 6b and communicate with the space inside the reservoir at two places 11b and 12b which are both situated in the plane of the axes 2 and 3 of the craft but are disposed symmetrically on opposite sides of the plane of symmetry 1-2 of the craft; in the same plane of symmetry 1-2 is provided a separator member or membrane 21 which is fixed to the wall of the reservoir and divides the reservoir into two parts comprising the communication positions 11b and 12b respectively. Beyond the positions 11b and 12b, the piping 10b is extended within the two parts of the reservoir by two diffuser members 22 which open out in funnel outlets with mean directions orientated towards the axis of the cylinder and obliquely to the two bases of the cylinder. Lastly, the membrane 21 is provided with a communication passage or orifice 21a which is disposed in the membrane adjacent the wall of the reservoir 6b diametrically opposite to the communication positions 11b and 12b.

The device is of course completed by a pump 13b disposed in the piping 10b and by a detector 18b which is positioned and connected to control the pump 13b in the same way as in the embodiment of FIG. 3.

The device described in FIG. 4 operates as follows:

When the pump 13b sets the liquid L into circulation, the liquid flows out of one of the two diffusers 22 in one of the two parts of the reservoir 6d to follow a flow path 23 which spreads out within the mass of liquid filling the reservoir and then converges progressively towards the communication orifice 21a, to spread out again on a similar flow path 24 in the other part of the reservoir and return converging on the second diffuser 22, thus closing the loop through the piping 10b. The drive of the pump 13b, in one direction or the other, is controlled by detector 18b in the same way as in the embodiment of FIG. 3 in accordance with equation (E).

I claim:

1. Gyroscope effect apparatus presenting a spin axis about which the apparatus is to spin, and comprising stabilizer means for damping nutation of said spin axis about an angular momentum vector, characterized in that said stabilizer means comprises means defining a closed loop liquid flow path, pump means for pumping liquid round said flow path in periodic motion, detector means responsive to a parameter relating to the angle of nutation of said spin axis, and control means for controlling said pump means as a function of said parameter whereby to control the amplitude and phase of said periodic motion of said liquid according to a law such that the overall angular momentum of said apparatus is conserved, whereby the component of angular velocity of said apparatus about said spin axis increases when the component of angular velocity perpendicular to said spin axis decreases, and whereby said liquid loop stabilizer means provides a lower threshold of nutation damping of about one order of magnitude lower than does a solid flywheel.

2. Apparatus as claimed in claim 1 wherein said liquid fills said flow path at least partially, characterised in that said liquid has a density of substantially 1000 Kg/m3.

3. Apparatus as claimed in claim 1 which is a space craft having engines fuelled by a propergol, characterised in that said liquid in said flow path comprises at least a constituent of said propergol.

4. Apparatus as claimed in claim 1 characterised in that said flow path presents a general plane of symmetry extending in a direction parallel to said spin axis.

5. Apparatus as claimed in claim 4 characterised in that said parameter to which said detector means is responsive is an instantaneous component of angular velocity of said apparatus in a direction perpendicular to said spin axis and parallel to said plane of symmetry of said flow path, and said law of operation of said control means is such that the mass rate of fluid flow of said liquid in said flow path is substantially proportional to said component of angular velocity to which said detector means is responsive.

6. Apparatus as claimed in claim 5 characterised in that said detector means comprises accelerometer means responsive to said angular velocity component.

7. Apparatus as claimed in claim 1 characterised in that said means defining a fluid flow path comprises an annular duct forming an almost closed loop and connection means for connecting said pump means with the ends of said duct.

8. Apparatus as claimed in claim 7 comprising a reservoir for said liquid, characterised in that said connection means includes valve means for selectively connecting said duct with said reservoir.

9. Apparatus as claimed in claim 8 characterised in that said device includes further valve means for selectively connecting at least one intermediate point on said duct with said reservoir.

10. Apparatus as claimed in claim 9 characterised in that said further valve means is disposed symmetrically about said spin axis relative to the first said valve means.

11. Apparatus as claimed in claim 8 characterised in that said valve means comprises a four way valve for connecting said duct directly with said pump means in a first position of said valve and for connecting said pump means with said duct through said reservoir in a second position of said valve.

12. Apparatus as claimed in claim 7 characterised in that said duct is disposed inside said reservoir, said pump means is disposed outside said reservoir and said connection means passes through a wall of said reservoir adjacent said ends of said duct.

13. Apparatus as claimed in claim 12 wherein said reservoir has walls presenting a shape of revolution about an axis of symmetry of said reservoir characterised in that said duct is substantially circular and centred on said axis of symmetry, and is disposed adjacent said walls of said reservoir.

14. Apparatus as claimed in claim 1 characterised in that said means defining a liquid flow path comprises reservoir means for containing a stock of said liquid, and guide means for guiding said liquid to circulate within said reservoir means along a spread path.

15. Apparatus as claimed in claim 14 characterised in that said pump means is disposed outside said reservoir means and said means defining said flow path includes connection means for connecting said pump means with said guide means.

16. Apparatus as claimed in claim 14 characterised in that said reservoir means includes a separator member separating said reservoir means into first and second reservoir parts, said guide means including first and second guide means disposed respectively in said first and second reservoir parts, said first and second reservoir parts communicating at a position remote from said first and second guide means.

17. Apparatus as claimed in claim 16 characterised in that said separator means comprises a membrane extending along a plane of symmetry of said reservoir.

18. Apparatus as claimed in claim 17 characterised in that said membrane presents an orifice forming said position of communication between said first and second reservoir parts.

19. Apparatus as claimed in claim 1 characterised in that said pump means comprises a gear pump.

20. A gyroscope effect space craft presenting a spin axis about which the craft is to spin and comprising stabilizer means for damping nutation of said spin axis about an angular momentum vector, characterized in that said stabilizer means comprises means defining a closed loop liquid flow path presenting a mean plane including said spin axis, pump means for pumping liquid round said flow path, detector means responsive to a parameter relating to an instantaneous component of angular velocity of the craft perpendicular to said spin axis and parallel to said mean plane of said flow path, and control means responsive to said detector means for controlling said pump means to pump said liquid in periodic motion in said flow path at a mass flow rate proportional to said instantaneous component of angular velocity with a small phase lag, whereby to damp nutation of said spin axis without reducing the component of angular velocity about said spin axis and while conserving the overall angular momentum of said craft, and whereby said liquid loop stabilizer means provides a threshold of nutation damping of about one order of magnitude lower than does a solid flywheel.

21. A space craft as claimed in claim 20 characterised in that said pump means is reversible whereby said periodic motion is oscillatory.

22. A space craft as claimed in claim 20 comprising engines fuelled by a propergol characterised in that said liquid in said flow path comprises at least a constituent of said propergol.

23. A space craft as claimed in claim 22 including reservoir means for said propergol characterised in that said means defining a flow path comprises an annular duct and connection means for connecting said duct with said pump means, said connection means including valve means for selectively connecting said duct with said reservoir means.

24. A space craft as claimed in claim 22 including reservoir means for said propergol characterised in that said means defining a flow path comprises guide means for guiding said liquid to circulate within said reservoir along a spread path.

25. A space craft as claimed in claim 24 characterised in that said reservoir means includes a separator member separating said reservoir means into first and second reservoir parts, said guide means comprising first and second guide means disposed respectively in said first and second reservoir parts, and said reservoir parts communicating at a position remote from said first and second guide means.

* * * * *